United States Patent
Cho et al.

(10) Patent No.: US 9,075,591 B2
(45) Date of Patent: Jul. 7, 2015

(54) INTEGRATED INTERFACE SYSTEM FOR POWER-SYSTEM MONITORING AND CONTROL SYSTEM

(71) Applicant: LSIS CO., LTD., Anyang-si (KR)

(72) Inventors: Yoon Sung Cho, Pyeongtaek-si (KR); Yun Hyuk Choi, Anyang-si (KR); Young In Kim, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/273,088

(22) Filed: May 8, 2014

(65) Prior Publication Data

US 2014/0337655 A1 Nov. 13, 2014

(30) Foreign Application Priority Data

May 13, 2013 (KR) .......................... 10-2013-0053833

(51) Int. Cl.
*G05B 19/418* (2006.01)
*G06F 1/26* (2006.01)
*H04L 29/08* (2006.01)

(52) U.S. Cl.
CPC .............. *G06F 1/26* (2013.01); *H04L 67/1095* (2013.01); *G05B 19/4185* (2013.01); *G05B 2219/31104* (2013.01)

(58) Field of Classification Search
None
See application file for complete search history.

(56) References Cited

U.S. PATENT DOCUMENTS

| RE40,037 E * | 1/2008 | Hasegawa et al. ............. 340/635 |
| 2005/0159826 A1* | 7/2005 | Tanaka et al. ................... 700/83 |
| 2014/0006660 A1* | 1/2014 | Frei et al. ....................... 710/104 |

FOREIGN PATENT DOCUMENTS

| GB | 2358559 | 7/2001 |
| KR | 10-0964300 | 6/2010 |
| KR | 10-1020877 | 3/2011 |
| WO | 99/13418 | 3/1999 |

OTHER PUBLICATIONS

European Patent Office Application Serial No. 14161923.9, Search Report dated Oct. 6, 2014, 7 pages.
Korean Intellectual Property Office Application Serial No. 10-2013-0053833, Office Action dated Sep. 5, 2014, 3 pages.

* cited by examiner

*Primary Examiner* — Kris Rhu
(74) *Attorney, Agent, or Firm* — Lee, Hong, Degerman, Kang & Waimey

(57) ABSTRACT

An integrated interface system for a power-system monitoring and control system is provided. The integrated interface system includes an input and output (I/O) interface unit 220 performing data transmission to and reception from the external data source system; and a data exchange unit exchanging data by using the naming of a fixed electrical bus number for data exchange between a power-system monitoring and control system and the external data source system having a DB different from the power-system monitoring and control system.

6 Claims, 3 Drawing Sheets

INTEGRATED INTERFACE SYSTEM FOR POWER-SYSTEM MONITORING AND CONTROL SYSTEM

CROSS-REFERENCE TO RELATED APPLICATIONS

Pursuant to 35 U.S.C. §119(a), this application claims the benefit of earlier filing date and right of priority to Korean Patent Application No. 10-2013-0053833, filed on May 13, 2013, the contents of which are all hereby incorporated by reference herein in its entirety.

BACKGROUND

The present disclosure relates to an integrated interface system for a power-system monitoring and control system, and more particularly, to an automated integrated interface system for data exchange with an external system and data validation in a power-system monitoring and control system.

A power-system monitoring and control system is a system for monitoring and controlling a power system, such as a supervisory control and data acquisition (SCADA) or an EMS system.

The power-system monitoring and control system needs procedures for data exchange with an external system and data validation.

In the case of a typical power-system monitoring and control system, a system operator has manually input information on an external system into a database (DB).

That is, the system operator typically obtains data to input into the power-system monitoring and control system, through a document.

The system operator inputs the obtained data into a DB. The system operator re-starts a system in order to reflect input data to the current system in operation or reflects the input data to a DB through system switching or online update.

The system operator executes an application program based on the reflected DB.

The system operator checks whether the application program is normally executed. When the application program is not normally executed, he or she attempts to find the cause of an error. Finding the cause of the error is performed based on the input data. If the cause of the error is found, the system operator re-inputs data.

Thus, the input data may have a problem, there is a difficulty in operating the power-system monitoring and control system and thus the power-system monitoring and control system does not operate, and a lot of time is needed to find and correct which problems the input data has.

SUMMARY

Embodiments provide an automated integrated interface system for data exchange with an external system and data validation in a power-system monitoring and control system.

Embodiments also provide an integrated interface system that may be built as separate hardware and function as a data server.

Embodiments also provide an integrated interface system that may exchange data by using the naming of a fixed electrical bus number for data exchange between systems having different DBs.

Embodiments also provide an integrated interface system that may perform validation by using a dispatcher training simulator in order to validate the match of exchanged data.

In one embodiment, an integrated interface system for a power-system monitoring and control system includes an input and output (I/O) interface unit 220 performing data transmission to and reception from the external data source system; and a data exchange unit exchanging data by using the naming of a fixed electrical bus number for data exchange between a power-system monitoring and control system and the external data source system having a DB different from the power-system monitoring and control system.

The data exchange unit may search for a fixed electrical bus of data input from the external data source system through the I/O interface unit, compare and search for a corresponding electrical bus number with an electrical bus number of a DB of the power-system monitoring and control system, allocate a data name corresponding to the power-system monitoring and control system corresponding to a found number, and perform data exchange and validation.

The data exchange unit may transmit exchanged data to a dispatcher training simulator (DTS) server to validate of the match of the exchanged data and perform validation by using a DTS.

The data exchange unit may transmit data obtained and exchanged from the external data source system to the DTS server, and the DTS server may reflect data received from the data exchange unit to a typical power system DB and execute an application program based on reflected data.

In another embodiment, a data processing method of an integrated interface system for a power-system monitoring and control system includes performing data transmission to and reception from an external data source system by an I/O interface unit; and exchanging, by a data exchange unit, data by using the naming of a fixed electrical bus number for data exchange between a power-system monitoring and control system and the external data source system having a DB different from the power-system monitoring and control system through the I/O interface unit.

The exchanging of the data by the data exchange unit may include searching for a fixed electrical bus of data input from the external data source system through the I/O interface unit, comparing and searching for a corresponding electrical bus number with an electrical bus number of the DB of a power-system monitoring and control system, allocating a data name corresponding to a power-system monitoring and control system corresponding to a found number, and performing data exchange and validation.

The data processing method may further include transmitting, by the data exchange unit, exchanged data to a DTS server to validate of the match of the exchanged data and performing validation by using a DTS.

The data processing method further include transmitting, by the data exchange unit, data obtained and exchanged from the external data source system to the DTS server; and reflecting, by the DTS server, data received from the data exchange unit to a typical power system DB and executing an application program based on reflected data.

The details of one or more embodiments are set forth in the accompanying drawings and the description below. Other features will be apparent from the description and drawings, and from the claims.

DETAILED DESCRIPTION OF THE EMBODIMENTS

Figure 1:
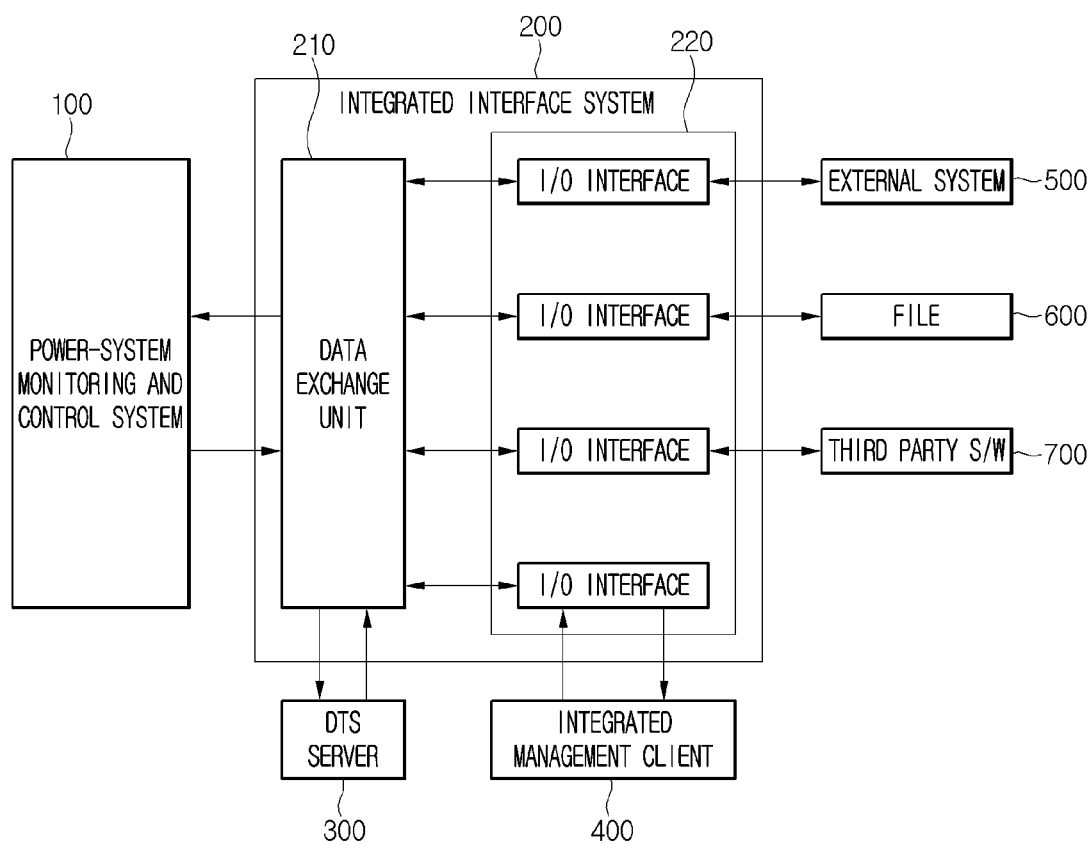
FIG. 1 is a block diagram of an integrated interface system for a power-system monitoring and control system according to an embodiment.

Various embodiments are described below in detail with reference to the accompanying drawings. The following embodiments are provided as examples so that the spirit of the present invention may be sufficiently delivered to a person skilled in the art. Thus, the present invention is not limited embodiments to be described below but may be implemented in other forms. In addition, the width, length, and thickness of components in the drawings may be exaggerated for convenience. The same reference numerals represent the same components throughout the disclosure.

FIG. 1 is a block diagram of an integrated interface system for a power-system monitoring and control system according to an embodiment.

Referring to FIG. 1, a dispatcher training simulator (DTS) server 300, an integrated management client 400, and an external data source system such as an external system 500, a file 600 and a third party S/W 700 may be connected to a power-system monitoring and control system 100 through an integrated interface system 200.

The power-system monitoring and control system 100 functions as a host server. The power-system monitoring and control system 100 may create data through the integrated interface system 200. That is, the power-system monitoring and control system 100 may receive validated data from the integrated interface system 200 and create data. Moreover, the power-system monitoring and control system 100 transmits data which it wants to externally transmit, to the integrated interface system 200.

The integrated interface system 200 may be connected to the external data source system such as an external system 500, a file 600, and a third party S/W 700. The integrated interface system 200 may include a data exchange unit 210, and an input and output (I/O) interface unit 220.

The data exchange unit 210 may exchange data by using the naming of a fixed electrical bus number for data exchange between the power-system monitoring and control system and the external data source system having a DB different from the power-system monitoring and control system.

The data exchange unit 210 searches for a fixed electrical bus of data input from the external data source system such as an external system 500, a file 600 and a third party S/W 700, compares and searches for a corresponding electrical bus number with the electrical bus number of the DB of an power-system monitoring and control system 100. The data exchange unit 210 may allocate a data name corresponding to a power-system monitoring and control system corresponding to a found number.

The data exchange unit 210 may transmit exchanged data to the DTS server for the match of the exchanged data and perform validation by using a DTS.

The I/O interface unit 220 performs data transmission and reception to and from the external data source system. The I/O interface unit 220 transmits, to the data exchange unit 210, data received from the external data source system such as an external system 500, a file 600, and a third party S/W 700.

The I/O interface unit 220 transmits data received from the data exchange unit 210 to the external system 500, the file 600, and the third party S/W 700.

The DTS server 300 is a DTS, connects data received from the data exchange unit 210 to a typical power system DB and executes an application program.

The DTS server 300 transmits a 'no error' signal to the exchange unit when there is no error as a result of performing the application program.

The integrated management client 400 is used for enabling a system operator to manage the integrated interface system 200. The integrated management client 400 may input the DB of the power-system monitoring and control system 100.

The external system 500 may include another power-system monitoring and control system.

The file 600 may include an American standard code for information interchange (ASCII) code, excel or text file.

The third party S/W 700 is a third application program and may include an independent power system interpreter for example.

The external system 500, the file 600, and the third party S/W 700 transmit data to the I/O interface unit 220 of the integrated interface system 200.

Figure 2:
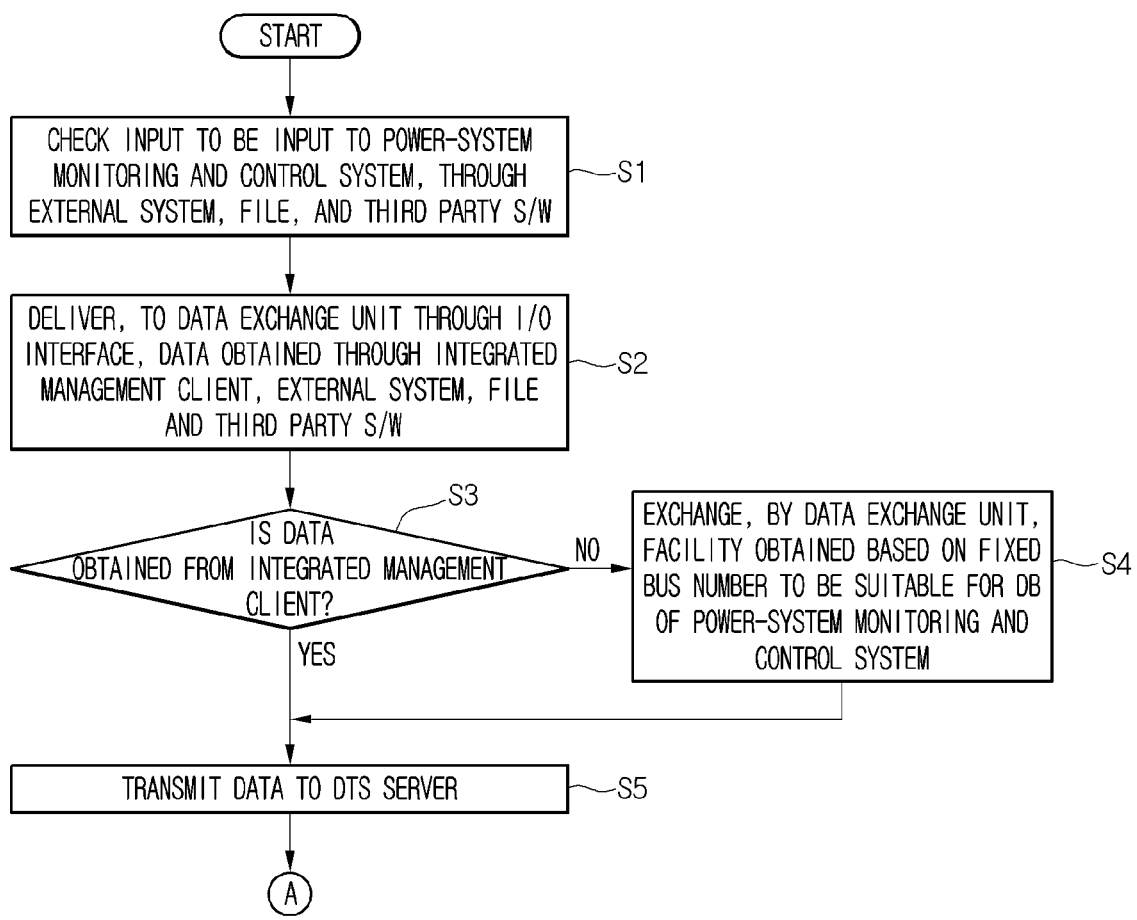
FIGS. 2 and 3 are flow charts of the operation of an integrated interface system for a power-system monitoring and control system according to an embodiment.
Figure 3:
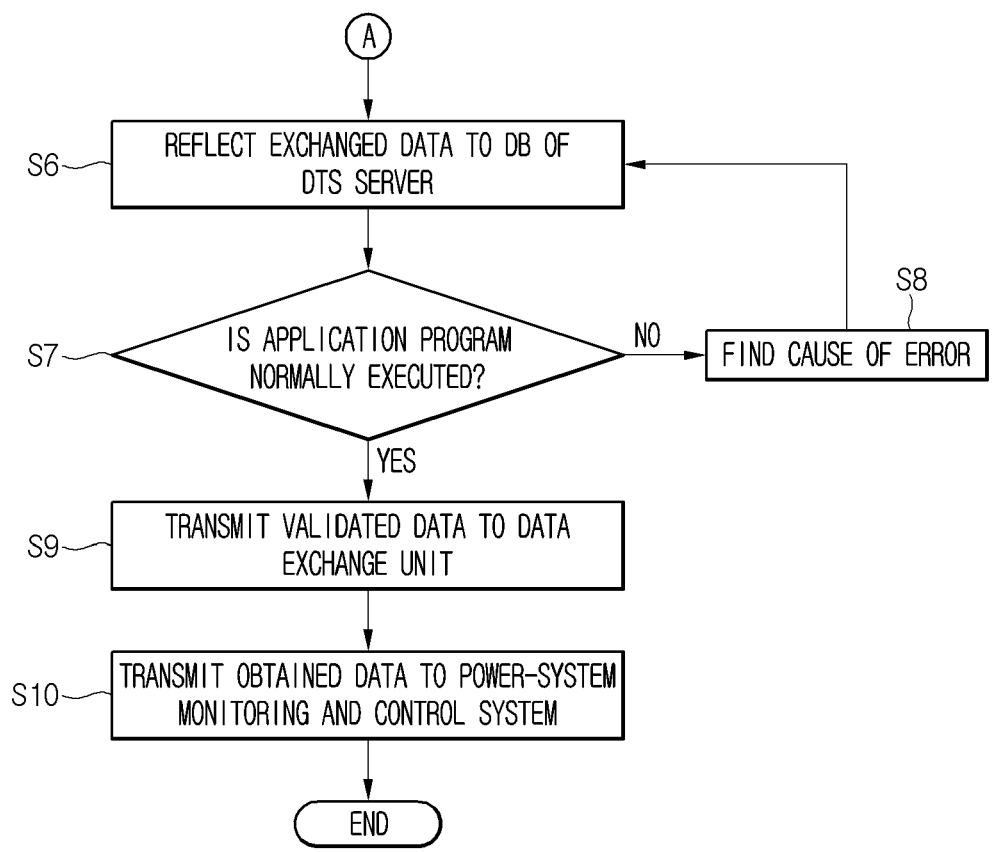

FIGS. 2 and 3 are flow charts of the operation of an integrated interface system for a power-system monitoring and control system according to an embodiment.

Referring to FIGS. 2 and 3, the integrated interface system 200 checks data to input to the power-system monitoring and control system 100, from the external system 500, the file 600, and the third party S/W 700 in step S1. On the other hand, a system operator may also directly input data through the integrated management client 400.

The integrated interface system 200 transmits, to the data exchange unit 210 through the I/O interface 220, data obtained through the integrated management client 400, the external system 500, the file 600, and the third party S/W 700 in step S2.

The integrated interface system 200 determines whether data is obtained from the integrated management client 400, in step S3.

If the data is not obtained from the integrated management client 400, the integrated interface system 200 searches for a fixed electrical bus with respect to data input from the external system 500 by using the data exchange unit 210, compares and searches for a corresponding electrical bus number with the electrical bus number of the DB of the power-system monitoring and control system 100. The integrated interface system 200 may allocate a data name corresponding to a power-system monitoring and control system 100 corresponding to a found number.

If there is data obtained from the integrated management client 400, the integrated interface system 200 transmits the data obtained from the integrated management client 400 to the DTS server in step S5.

In addition, the integrated interface system 200 transmits, to the DTS server 300, data obtained and exchanged from the external system 500, in step S5.

The DTS server 300 reflects data received from the data exchange unit 210 to a typical power system DB in step S6. Thus, the DTS server 300 executes an application program based on the reflected data.

The DTS server 300 determines whether the application program is normally performed, in step S7. The DTS server 300 finds the cause of an error if there is the error when executing the application program, in step S8, and reflects a found cause to a DB in step S6.

The DTS server 300 transmits validated data to the data exchange unit 210 in step S9.

After receiving a signal indicating "no error" from the DTS server 100, the integrated interface system 200 transmits data to the power-system monitoring and control system 100 in step S10. The power-system monitoring and control system 100 reflects received data to its DB.

According to embodiments, since a lot of data to be input to the power-system monitoring and control system is input through a valid system not a system operation, the system operation may save a time needed for a data input.

Since the integrated interface system according to embodiments use the naming method of a fixed electric bus, it is possible to prevent a data error from occurring.

Since the integrated interface system according to embodiments connect different two systems, it is possible to link various third party S/Ws.

Since data input through the integrated interface system according to embodiments is data validated preliminarily through the DTS, there is no problem due to an error in data input.

According to embodiments, it is possible to enhance stability in operating a system through automation between the power-system monitoring and control system and the external system.

While particular embodiments have been described in the detailed description of the present invention, several variations may be made without departing from the scope of the present invention. Therefore, the scope of the present invention should not be limited to the above-described embodiments but be defined by the following claims and equivalents thereof.

What is claimed is:

1. An integrated interface system for a power-system monitoring and control system, the integrated interface system comprising:
    an input and output (I/O) interface unit performing data transmission to and reception from an external data source system; and
    a data exchange unit exchanging data by using the naming of a fixed electrical bus number for data exchange between the power-system monitoring and control system and the external data source system having a database (DB) different from the power-system monitoring and control system,
    wherein the data exchange unit transmits exchanged data to a dispatcher training simulator (DTS) server to validate a match of the exchanged data and performs validation by using a DTS.

2. The integrated interface system according to claim 1, wherein the data exchange unit searches for a fixed electrical bus of data input from the external data source system through the I/O interface unit, compares and searches for a corresponding electrical bus number with an electrical bus number of a DB of the power-system monitoring and control system, allocates a data name corresponding to the power-system monitoring and control system corresponding to a found number, and performs data exchange and validation.

3. The integrated interface system according to claim 1, wherein the data exchange unit transmits data obtained and exchanged from the external data source system to the DTS server, and
    the DTS server reflects data received from the data exchange unit to a typical power system DB and executes an application program based on reflected data.

4. A data processing method of an integrated interface system for a power-system monitoring and control system, the data processing method comprising:
    performing data transmission to and reception from an external data source system by an I/O interface unit;
    exchanging, by a data exchange unit, data by using the naming of a fixed electrical bus number for data exchange between the power-system monitoring and control system and the external data source system having a database (DB) different from the power-system monitoring and control system through the I/O interface unit; and
    transmitting, by the data exchange unit, exchanged data to a dispatcher training simulator (DTS) server to validate a match of the exchanged data and performing validation by using a DTS.

5. The data processing method according to claim 4, wherein the exchanging of the data by the data exchange unit comprises searching for a fixed electrical bus of data input from the external data source system through the I/O interface unit, comparing and searching for a corresponding electrical bus number with an electrical bus number of the DB of a power-system monitoring and control system, allocating a data name corresponding to a power-system monitoring and control system corresponding to a found number, and performing data exchange and validation.

6. The data processing method according to claim 4, further comprising transmitting, by the data exchange unit, data obtained and exchanged from the external data source system to the DTS server; and
    reflecting, by the DTS server, data received from the data exchange unit to a typical power system DB and executing an application program based on reflected data.

* * * * *